Dec. 10, 1929.  J. E. SUMRALL  1,739,427
CHURN DASHER
Filed Feb. 11, 1929
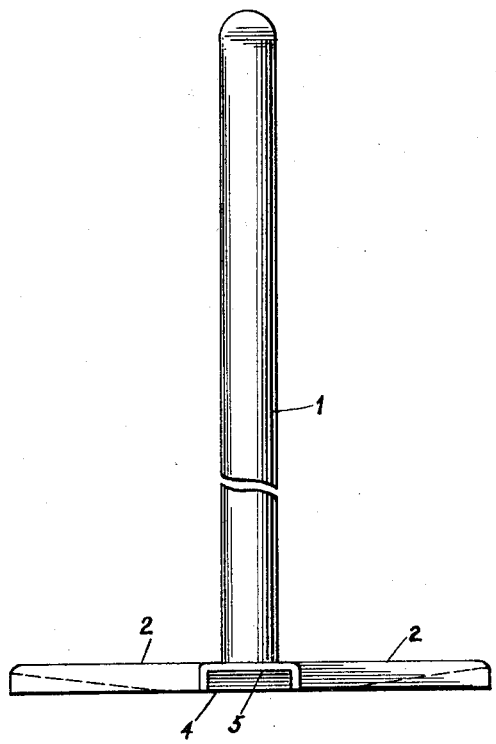
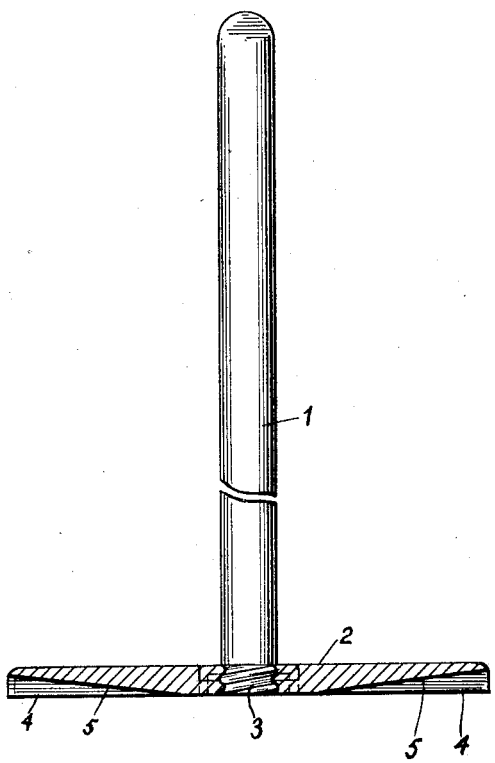
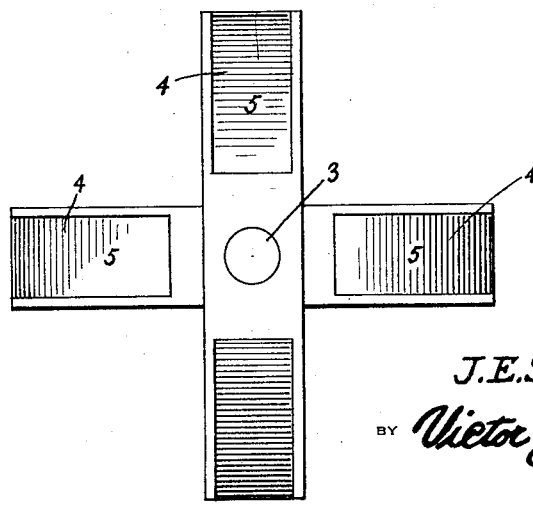
J. E. Sumrall INVENTOR
BY *Victor J. Evans*
ATTORNEY
WITNESS Patented Dec. 10, 1929

1,739,427

UNITED STATES PATENT OFFICE

JAMES E. SUMRALL, OF HICO, TEXAS

CHURN DASHER

Application filed February 11, 1929. Serial No. 339,090.

This invention relates to a dasher for a churn, the dasher of which is adapted to be reciprocated instead of being rotated, the general object of the invention being to make the blades of the dasher with recesses in their under portions, so formed as to force the cream outwardly from under the blades on the downward movement of the dasher, so that the cream will be thoroughly agitated, and thus the butter will be quickly made.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denotes like or corresponding parts throughout the several views, and in which:—

Figure 1 is a side view of the dasher.

Figure 2 is a similar view, but showing two of the blades in section.

Figure 3 is a bottom plan view.

In these views, the numeral 1 indicates the handle or stem of the dasher, and 2 indicates the blades or paddles thereof, these blades extending at right angles to each other and the handle is threaded into a hole formed at the center of the paddle part, as shown at 3. Each blade is formed with a recess 4 in its under face, the recess forming a channel, with its top wall tapering upwardly and outwardly from a point adjacent the inner end of the blade through its outer end, as shown at 5, so that the cream or other material is forced outwardly during the downward movement of the dasher, whereby the cream is thoroughly agitated and the butter is quickly made.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A dasher of the reciprocatory class having its blades or paddles formed with recesses in their under faces, the recesses extending from a point adjacent the inner end of each paddle through the outer end thereof, said recesses forming channels, with their upper walls sloping upwardly and outwardly.

In testimony whereof I affix my signature.

JAMES E. SUMRALL.